(12) United States Patent
Tsuji

(10) Patent No.: US 11,609,731 B2
(45) Date of Patent: Mar. 21, 2023

(54) IMAGE FORMING APPARATUS, NON-TRANSITORY COMPUTER READABLE MEDIUM, AND IMAGE FORMING METHOD

(71) Applicant: FUJIFILM Business Innovation Corp., Tokyo (JP)

(72) Inventor: Tsunaki Tsuji, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/644,209

(22) Filed: Dec. 14, 2021

(65) Prior Publication Data

US 2023/0036596 A1 Feb. 2, 2023

(30) Foreign Application Priority Data

Aug. 2, 2021 (JP) .............................. JP2021-126968

(51) Int. Cl.
*G06F 3/12* (2006.01)

(52) U.S. Cl.
CPC .......... *G06F 3/1255* (2013.01); *G06F 3/1205* (2013.01); *G06F 3/1257* (2013.01); *G06F 3/1285* (2013.01); *G06F 3/1204* (2013.01)

(58) Field of Classification Search
CPC .... G06F 3/1255; G06F 3/1205; G06F 3/1257; G06F 3/1285; G06F 3/1204

USPC ......................................................... 358/1.15
See application file for complete search history.

(56) References Cited

U.S. PATENT DOCUMENTS

| 10,452,331 | B2 | 10/2019 | Murata | |
|---|---|---|---|---|
| 11,089,174 | B1 * | 8/2021 | Morales | ............. H04N 1/00633 |
| 2008/0013109 | A1 * | 1/2008 | Chen | ..................... G06F 3/1285 |
| | | | | 358/1.1 |

FOREIGN PATENT DOCUMENTS

JP           6656112 B2     3/2020

\* cited by examiner

*Primary Examiner* — Darryl V Dottin
(74) *Attorney, Agent, or Firm* — Sughrue Mion, PLLC

(57) ABSTRACT

An image forming apparatus includes a processor configured to: obtain user information and a print job, the user information indicating a user associated with a second image forming apparatus different from the image forming apparatus, the print job including setting information about a setting used in printing; when the setting information of the obtained print job is not allowed to be applied to the image forming apparatus, further obtain substitute information indicating a substitute for the setting information of the second image forming apparatus with which the association is indicated by the user information; and execute the print job by applying the obtained substitute information.

20 Claims, 7 Drawing Sheets

FIG. 5

| USER ID | ASSOCIATED APPARATUS |
|---------|----------------------|
| XXX     | PARENT APPARATUS     |

FIG. 6

| USER ID | FILE NAME | SPECIFIED SHEET SIZE |
|---------|-----------|----------------------|
| XXX     | AAA.doc   | A4                   |

FIG. 7

| TRAY INFORMATION OF PARENT APPARATUS | | |
|--------------|--------------|--------------------|
| TRAY NUMBER  | SETTING SIZE | SETTING SHEET      |
| TRAY 1       | A4           | PLAIN PAPER        |
| TRAY 2       | A4           | HIGH-QUALITY PAPER |
| TRAY 3       | A3           | PLAIN PAPER        |
| ⋮            | ⋮            | ⋮                  |

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2021-126968 filed Aug. 2, 2021.

BACKGROUND

(i) Technical Field

The present disclosure relates to an image forming apparatus, a non-transitory computer readable medium, and an image forming method.

(ii) Related Art

Japanese Patent No. 6656112 discloses a print system. In the print system, a first image forming apparatus, which may be set as a child apparatus, and a second image forming apparatus, which may be set as a parent apparatus, are connected to different networks. The print system includes a user terminal which may be connected to the first image forming apparatus. The second image forming apparatus stores a print job received from the user terminal. The first image forming apparatus may use a print service for executing the stored print job. The user terminal includes an inquiry information transmission unit which transmits inquiry information to the first image forming apparatus. The first image forming apparatus includes a storage unit and an identification-information transmission controller. The storage unit stores identification information of the second image forming apparatus which is set as a parent apparatus. When inquiry information is received from the user terminal, if the print service is enabled and the first image forming apparatus is set as a child apparatus, the identification-information transmission controller transmits the identification information to the user terminal. The user terminal includes a print-job transmission unit which, when the identification information is received from the first image forming apparatus, transmits a print job to the second image forming apparatus indicated by the identification information.

A technique for multiple image forming apparatuses connected over a network has been proposed. In the technique, a parent apparatus, which receives a print job from a user, and child apparatuses, which may obtain the print job from the parent apparatus, are set. Thus, any image forming apparatus may execute the print job.

Among multiple image forming apparatuses connected to a network, each user normally uses their second image forming apparatus (for example, their parent apparatus) which may be preregistered for the user. Information (hereinafter referred to as "substitute information") indicating a substitute for specified setting information (for example, the sheet size), which is used if the specified setting information is not allowed to be applied to an image forming apparatus, may be set in advance.

However, an image forming apparatus, which actually executes a print job, may have substitute information different from that of the second image forming apparatus.

Therefore, when an image forming apparatus, in which substitute information different from that of the second image forming apparatus is set, executes a print job by applying the substitute information of the image forming apparatus, an unintended result may be output because the substitute information of the preregistered second image forming apparatus is not applied.

SUMMARY

Aspects of non-limiting embodiments of the present disclosure relate to an image forming apparatus, a non-transitory computer readable medium, and an image forming method which suppress output of a result, which a user does not intend to obtain, even when an image forming apparatus, in which substitute information different from that of a preregistered second image forming apparatus is set, executes a print job.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a processor configured to: obtain user information and a print job, the user information indicating a user associated with a second image forming apparatus different from the image forming apparatus, the print job including setting information about a setting used in printing; when the setting information of the obtained print job is not allowed to be applied to the image forming apparatus, further obtain substitute information indicating a substitute for the setting information of the second image forming apparatus with which the association is indicated by the user information; and execute the print job by applying the obtained substitute information.

BRIEF DESCRIPTION OF THE DRAWINGS

Exemplary embodiments of the present disclosure will be described in detail based on the following figures, wherein:

FIG. 5 is a diagram illustrating exemplary user information according to the exemplary embodiments;

FIG. 6 is a diagram illustrating exemplary setting information of print job information according to the exemplary embodiments;

FIG. 7 is a diagram illustrating exemplary tray information of a parent apparatus, according to the exemplary embodiments;

DETAILED DESCRIPTION

First Exemplary Embodiment

Figure 1:
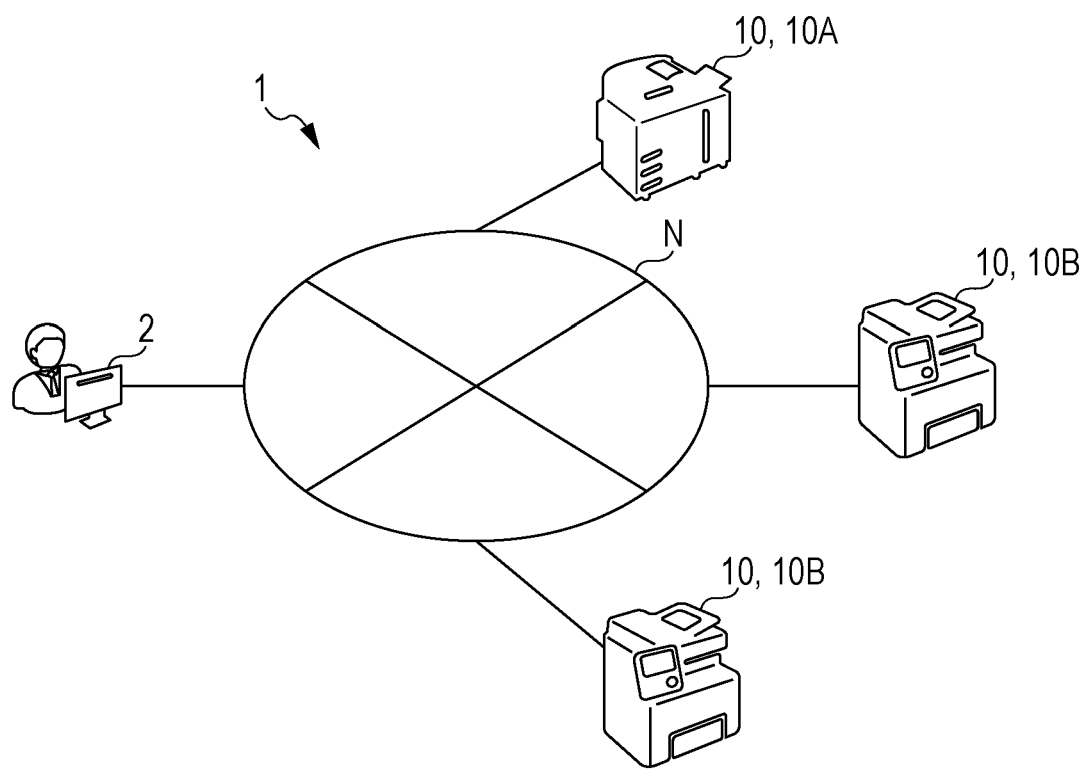
FIG. 1 is a schematic diagram illustrating an exemplary configuration of an image forming system according to exemplary embodiments.

By referring to the drawings, exemplary embodiments of the present disclosure will be described in detail below. FIG. 1 is a schematic diagram illustrating an exemplary configuration of an image forming system 1 according to a first exemplary embodiment.

For example, as illustrated in FIG. 1, the image forming system 1 has a configuration in which a terminal 2, which is operated by a user, and multiple image forming apparatuses 10 are connected to each other over a network N. The image forming apparatuses 10 include an image forming apparatus (hereinafter referred to as a "parent apparatus") 10A, which serves as a parent apparatus, and image forming apparatuses (hereinafter referred to as "child apparatuses") 10B, which serve as child apparatuses.

The terminal 2 is a device, such as a personal computer or a tablet computer, which is operated by a user to set a print job and transmit the print job to an image forming apparatus 10. A print job according to the first exemplary embodiment includes file data, which is to be printed, and information (hereinafter referred to as "setting information") about settings used in printing.

The parent apparatus 10A is an image forming apparatus 10 which obtains, for storage, a print job transmitted by a user, and executes the print job in response to the user's instruction to do the print job. The parent apparatus 10A transmits a print job to a child apparatus 10B in response to a request for the print job.

In response to a user's instruction to do a print job, a child apparatus 10B obtains the print job, which has been transmitted by the user, from the parent apparatus 10A, and executes the obtained print job.

In the image forming system 1 according to the first exemplary embodiment, the parent apparatus 10A stores a print job transmitted by a user, and an image forming apparatus 10 (the parent apparatus 10A or a child apparatus 10B), to which the user gives an instruction to do the print job, executes the print job. For example, when a user instructs the parent apparatus 10A to do a print job, the parent apparatus 10A executes the print job of the user, which is stored in the parent apparatus 10A. When a user instructs a child apparatus 10B to do a print job, the child apparatus 10B obtains the print job of the user from the parent apparatus 10A, and executes the print job. The parent apparatus 10A is an exemplary "second image forming apparatus", and the child apparatus 10B is an exemplary "image forming apparatus" in the claims. The case in which a child apparatus 10B executes a print job will be described below. In addition, the case in which a frequently-used image forming apparatuses 10 (whose frequency of use is the highest) of each user is registered in advance in association with the user will be described below.

In execution of a print job, when an image forming apparatus 10 according to the first exemplary embodiment detects that the setting information is not allowed to be applied, the image forming apparatus 10 applies information (hereinafter referred to as "substitute information"), which serves as a substitute for the setting information, to execute the print job. For example, in the case where a sheet size of "A4" is set as setting information, when an image forming apparatus 10 is running out of A4 sheets, the substitute information is used to determine a sheet substituted for A4 sheet. Specifically, the substitute information indicates a policy for changing the sheet size registered in the setting information, such as "larger size" or "smaller size". That is, in execution of a print job, when an image forming apparatus 10 is running out of A4 sheets, the substitute information is applied, and the print job is executed by using sheets larger or smaller than A4 sheet.

Figure 2:
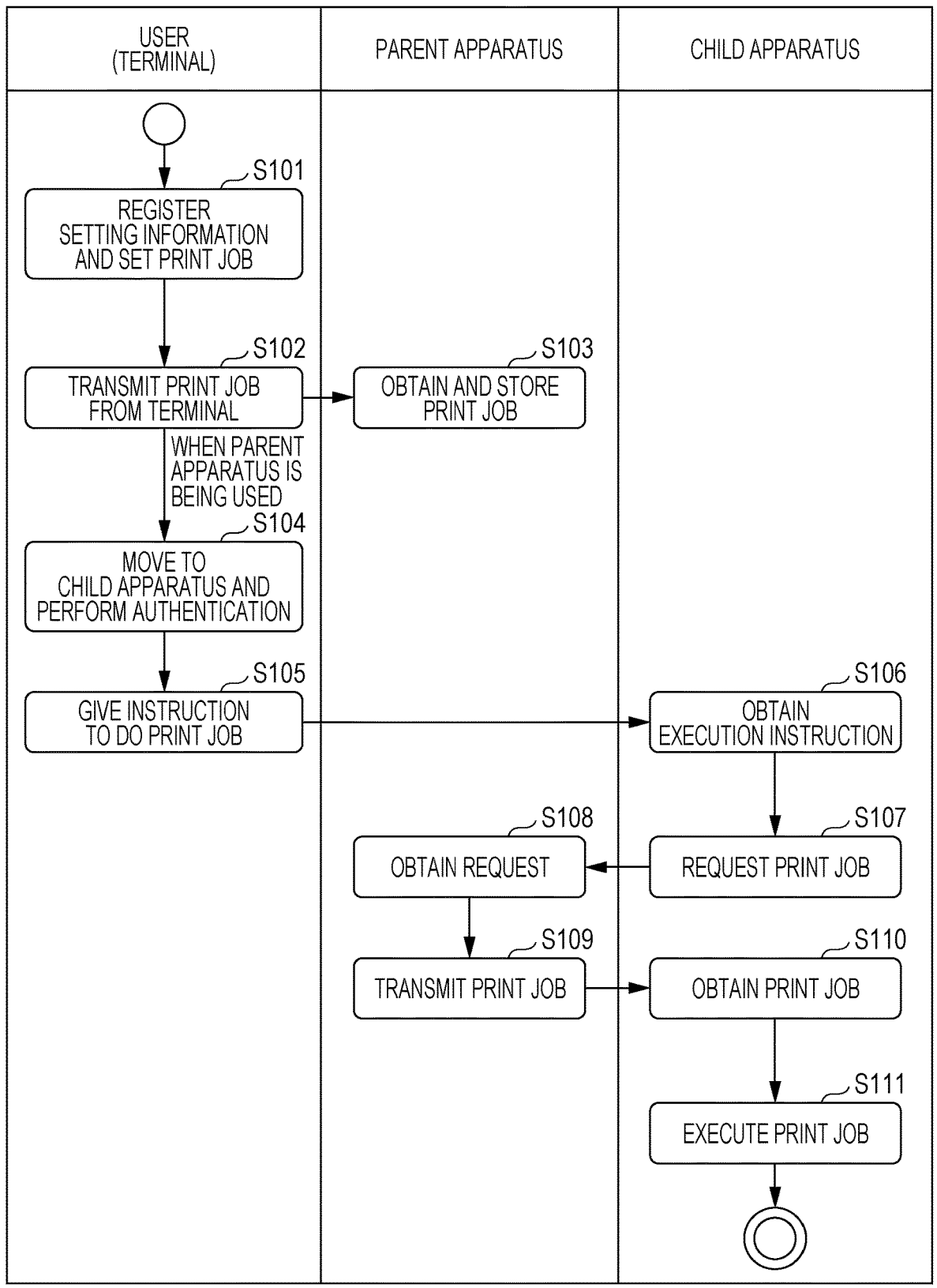
FIG. 2 is an activity diagram illustrating an exemplary flow in which a child apparatus executes a print job stored in a parent apparatus, according to the exemplary embodiments.

By referring to FIG. 2, a flow in which a child apparatus 10B executes a print job, which has been transmitted to the parent apparatus 10A by a user, will be described. FIG. 2 is an activity diagram illustrating an exemplary flow in which a child apparatus 10B executes a print job obtained from the parent apparatus 10A.

For example, as illustrated in FIG. 2, a user registers setting information such as a sheet size, and sets a print job (step S101). The user transmits, to an image forming apparatus 10, the print job which has been set by using the terminal 2 being operated by the user (step S102).

The parent apparatus 10A obtains, for storage, the print job transmitted from the user (step S103).

After transmission of the print job, the user moves to a child apparatus 10B, performs a user authentication on the child apparatus 10B (step S104), and operates the child apparatus 10B to instruct the child apparatus 10B to do the transmitted print job (step S105).

The child apparatus 10B obtains the instruction to do the print job (step S106), and requests the print job from the parent apparatus 10A (step S107).

When the parent apparatus 10A obtains the request for the print job (step S108), the parent apparatus 10A transmits the stored print job to the child apparatus 10B (step S109).

The child apparatus 10B obtains the print job from the parent apparatus 10A (step S110), and executes the obtained print job (step S111).

As described above, in execution of a print job, the print job is obtained from the parent apparatus 10A storing the print job. Thus, a user may do a print job by using any of the image forming apparatuses 10 without being conscious of whether the image forming apparatus 10 is the parent apparatus 10A or a child apparatus 10B. For example, a user planned to make the parent apparatus 10A do a print job. However, when the parent apparatus 10A is being used, the user may make a child apparatus 10B do the print job.

A method for suppressing output of a result, which a user does not intend to obtain, even in the case where an image forming apparatus 10 associated with the user is the parent apparatus 10A and where a child apparatus 10B executes a print job will be described.

Figure 3:
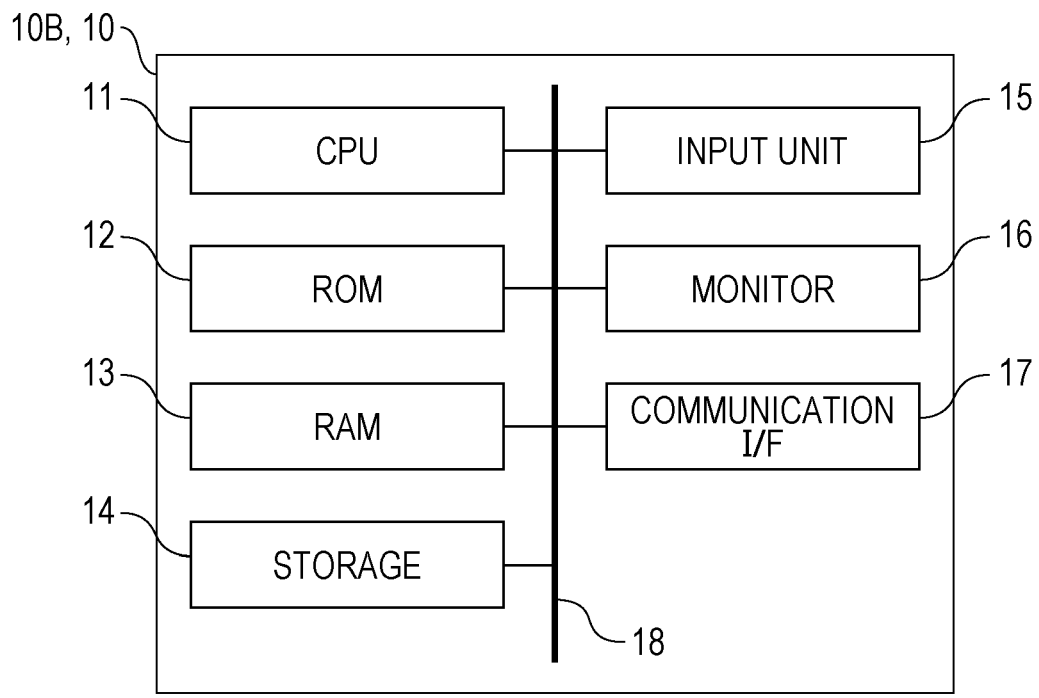
FIG. 3 is a block diagram illustrating an exemplary hardware configuration of an image forming apparatus according to the exemplary embodiments.

By referring to FIG. 3, the hardware configuration of a child apparatus 10B (image forming apparatus 10) will be described. FIG. 3 is a block diagram illustrating an exemplary hardware configuration of a child apparatus 10B according to the first exemplary embodiment.

As illustrated in FIG. 3, a child apparatus 10B according to the first exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are connected to each other through a bus 18. The CPU 11 is an exemplary processor.

The CPU 11 controls the entire child apparatus 10B. The ROM 12 is used to store, for example, various programs, including an image forming program used in the first exemplary embodiment, and data. The RAM 13 is a memory used as a work area in execution of various programs. The CPU 11 loads programs, which are stored in the ROM 12, on the RAM 13 for execution. Thus, the CPU 11 obtains substitute information and executes a print job. The storage 14 is, for example, a hard disk drive (HDD), a solid state drive (SSD), or a flash memory. The storage 14 may store, for example, the image forming program. Examples of the input unit 15 include a touch panel and a keyboard which receive, for example, input of characters. The monitor 16 displays characters and images. The communication I/F 17 receives/transmits data.

Figure 4:
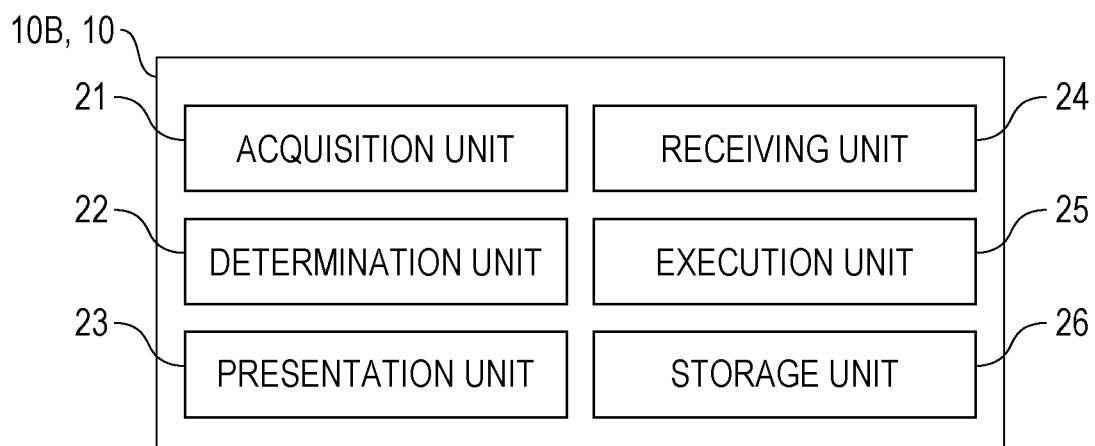
FIG. 4 is a block diagram illustrating an exemplary functional configuration of an image forming apparatus according to the exemplary embodiments.

By referring to FIG. 4, the functional configuration of a child apparatus 10B will be described. FIG. 4 is a block diagram illustrating an exemplary functional configuration of a child apparatus 10B according to the first exemplary embodiment.

For example, as illustrated in FIG. 4, a child apparatus 10B includes an acquisition unit 21, a determination unit 22, a presentation unit 23, a receiving unit 24, an execution unit 25, and a storage unit 26. The CPU 11, which executes the image forming program, functions as the acquisition unit 21, the determination unit 22, the presentation unit 23, the receiving unit 24, the execution unit 25, and the storage unit 26.

The acquisition unit 21 acquires user information and a print job which is stored in the parent apparatus 10A. The acquisition unit 21 uses the user information to acquire information (hereinafter referred to as "tray information"), which indicates the tray configuration of an image forming apparatus 10 (parent apparatus 10A) with which an association is indicated by the user information, and substitute information.

The user information indicates an association between a user and an image forming apparatus 10 that is frequently used by the user (that is, whose frequency of use is the highest). For example, as illustrated in FIG. 5, the user information includes the user identification (ID) and the associated apparatus. The user ID is information for identifying a user. The associated apparatus indicates the name of an image forming apparatus 10 that is frequently used by the user.

A print job includes setting information. For example, as illustrated in FIG. 6, the setting information according to the first exemplary embodiment includes the user ID, the file name, and the specified sheet size. The file name is the name of file data that is to be printed. The specified sheet size is the sheet size specified by the user.

For example, as illustrated in FIG. 7, the tray information according to the first exemplary embodiment includes the tray number, the setting size, and the setting sheet. The tray number is a number for identifying a tray installed in the parent apparatus 10A (image forming apparatus 10). The setting size is the size of sheets held in each tray. The setting sheet is the type of sheets held in each tray.

The determination unit 22 uses the user information to determine whether the user information indicates an association with an image forming apparatus 10 other than the child apparatus 10B. When the user information indicates an association with an image forming apparatus 10 (parent apparatus 10A) other than the child apparatus 10B, the determination unit 22 determines whether the setting information of a print job is not allowed to be applied in execution of the print job. When the user information indicates an association with an image forming apparatus 10 other than the child apparatus 10B and the setting information is not allowed to be applied to the child apparatus 10B, the acquisition unit 21 acquires the substitute information of the image forming apparatus 10 (parent apparatus 10A) with which an association is indicated by the user information.

In addition, the determination unit 22 determines whether the tray configuration of the parent apparatus 10A corresponds to that of the child apparatus 10B, by using the tray information of the parent apparatus 10A with which an association is indicated by the user information acquired by the acquisition unit 21. For example, when the tray configuration of the parent apparatus 10A, which is described in the obtained tray information, matches that of the child apparatus 10B, the determination unit 22 determines that the tray configuration of the parent apparatus 10A corresponds to that of the child apparatus 10B, and the execution unit 25, which is described below, executes the print job.

In the first exemplary embodiment, the case in which, if the tray configuration of the parent apparatus 10A matches that of the child apparatus 10B, it is determined that the obtained tray configuration corresponds to that of the child apparatus 10B is described. However, the case is not limited to this. When the sheet sizes installed in the parent apparatus 10A are the same as those in the child apparatus 10B (for example, the tray numbers in the parent apparatus 10A are different from those in the child apparatus 10B, but "A4" size and "A3" size are installed in both the apparatuses), it may be determined that the obtained tray configuration of the parent apparatus 10A matches that of the child apparatus 10B.

The determination unit 22 uses the substitute information of the parent apparatus 10A, which is acquired by the acquisition unit 21, to determine whether the substitute information is allowed to be applied to the child apparatus 10B. Specifically, when the substitute information is to be applied to the child apparatus 10B on the basis of the specified sheet size of the print job, if the child apparatus 10B has a corresponding sheet size, the determination unit 22 determines that the substitute information is allowed to be applied to the child apparatus 10B. For example, in the case where the specified sheet size is "A4" and where the substitute information indicates "larger size", when sheets of a size larger than "A4" sheet are installed in the child apparatus 10B, the determination unit 22 determines that the substitute information is allowed to be applied to the child apparatus 10B. When sheets of a size larger than A4 sheet are not installed in the child apparatus 10B, the determination unit 22 determines that the substitute information is not allowed to be applied to the child apparatus 10B.

When the sheet size of the parent apparatus 10A, which is obtained by applying the substitute information on the basis of the specified sheet size of a print job, is the same as that of the child apparatus 10B, the determination unit 22 may determine that the substitute information is allowed to be applied. For example, in the case where the specified sheet size is "A4" and where the substitute information is "larger size", when the same sheet size, A3, is used in the parent apparatus 10A and the child apparatus 10B after application of "larger size" as the substitute information, the determination unit 22 determines that the substitute information is allowed to be applied. When different sizes of sheets are used after application of the same substitute information, such as use of A3 sheets in the parent apparatus 10A and use of B4 sheets in the child apparatus 10B, the determination unit 22 determines that the substitute information is not allowed to be applied.

When the determination unit 22 determines that the tray configuration of the parent apparatus 10A does not correspond to that of the child apparatus 10B, the presentation unit 23 presents a message that the tray configuration of the parent apparatus 10A does not correspond to that of the child apparatus 10B. Specifically, the presentation unit 23 displays, for notification to a user, a message that the tray configuration of the parent apparatus 10A does not correspond to that of the child apparatus 10B.

When the determination unit 22 determines that the substitute information is not allowed to be applied to the child apparatus 10B, the presentation unit 23 presents a message that the substitute information of the parent apparatus 10A is not allowed to be applied to the child apparatus 10B, and presents substitute information alternatives that are allowed to be applied. For example, the presentation unit 23 displays, for notification to a user, a message that sheets corresponding to the substitute information of the parent apparatus 10A are not installed in the child apparatus 10B. In addition, the presentation unit 23 displays substitute information alternatives, which are allowed to be applied, and a message for prompting selection of a substitute information alternative.

The receiving unit 24 receives a substitute information alternative selected by a user.

The execution unit 25 uses the specified sheet size in the setting information of a print job to execute the print job. When the setting information of a print job is not allowed to be applied to the child apparatus 10B, the execution unit 25 applies the obtained substitute information of the parent apparatus 10A to execute the print job. In addition, when the receiving unit 24 receives a substitute information alternative, the execution unit 25 applies the substitute information alternative to execute the print job.

The storage unit 26 stores the substitute information acquired by the acquisition unit 21. The substitute information according to the first exemplary embodiment may be obtained in execution of a print job. Alternatively, the substitute information may be obtained from multiple image forming apparatuses 10 connected to the common network N in startup of the child apparatus 10B, and may be stored in advance.

Figure 8:
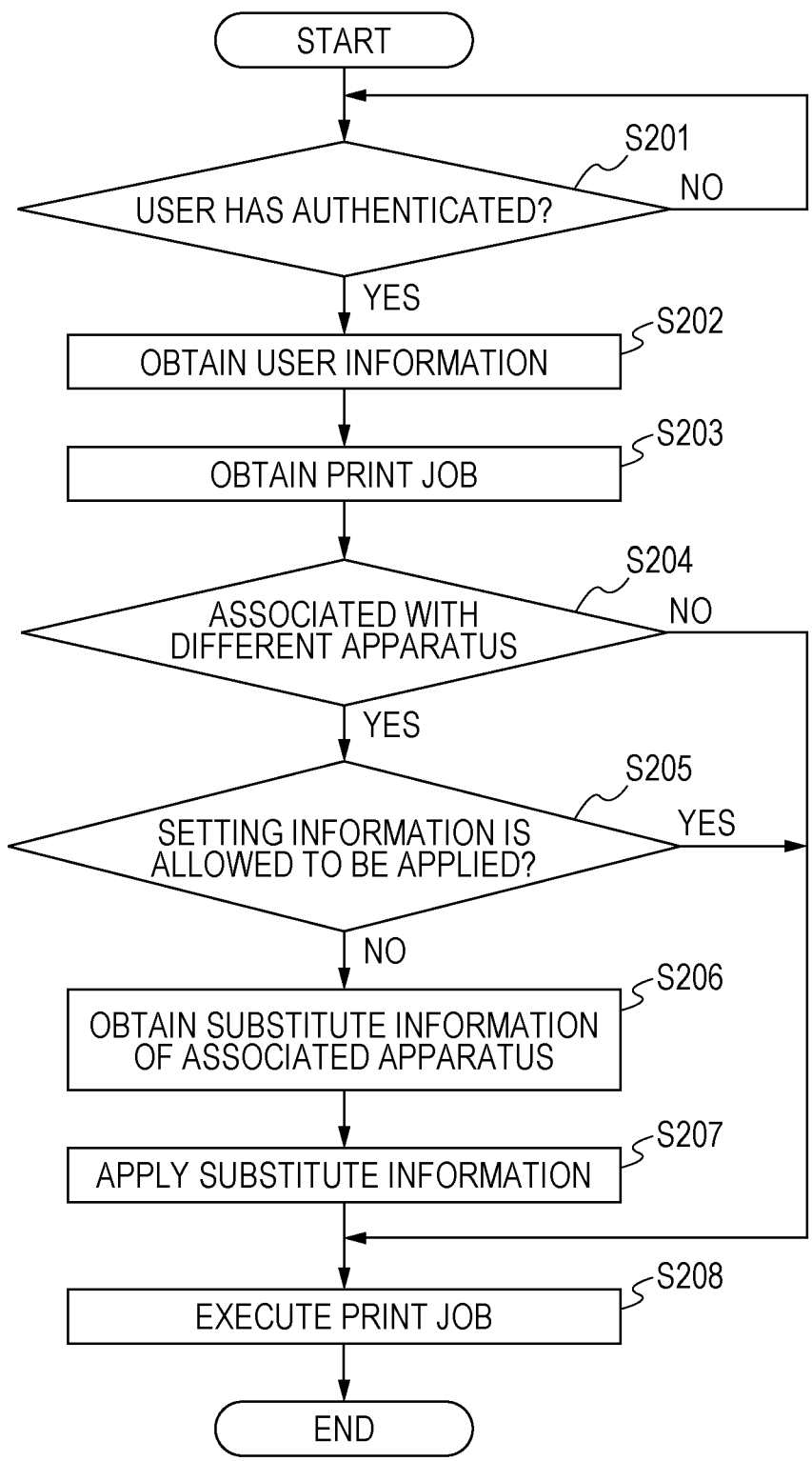
FIG. 8 is a flowchart of an exemplary process of executing a print job, according to a first exemplary embodiment.

By referring to FIG. 8, the operation of a child apparatus 10B (image forming apparatus 10) according to the first exemplary embodiment will be described. FIG. 8 is a flowchart of an exemplary process of executing a print job, according to the first exemplary embodiment. The CPU 11 reads the image forming program from the ROM 12 or the storage 14 for execution. Thus, the image forming process illustrated in FIG. 8 is performed. The image forming process illustrated in FIG. 8 is performed, for example, when a user inputs an instruction to do a print job.

In step S201, the CPU 11 determines whether the user has authenticated. If the user has authenticated (YES in step S201), the CPU 11 proceeds to step S202. If the user has not authenticated (NO in step S201), the CPU 11 waits until the user has authenticated.

In step S202, the CPU 11 obtains the user information of the authenticated user.

In step S203, the CPU 11 obtains a print job of the authenticated user. A print job of the authenticated user is such a print job that the user ID indicating the authenticated user corresponds to the user ID in the setting information of the print job illustrated in FIG. 6.

In step S204, the CPU 11 determines whether the user information indicates an association with an image forming apparatus 10 other than the child apparatus 10B. If the user information indicates an association with an image forming apparatus 10 other than the child apparatus 10B (YES in step S204), the CPU 11 proceeds to step S205. If the user information does not indicate an association with an image forming apparatus 10 other than the child apparatus 10B (the user information indicates an association with the child apparatus 10B) (NO in step S204), the CPU 11 proceeds to step S208.

In step S205, the CPU 11 determines whether the setting information of the print job is allowed to be applied to the child apparatus 10B in execution of the print job. If the setting information of the print job is not allowed to be applied to the child apparatus 10B (NO in step S205), the CPU 11 proceeds to step S206. If the setting information of the print job is allowed to be applied to the child apparatus 10B (YES in step S205), the CPU 11 proceeds to step S208.

In step S206, the CPU 11 obtains the substitute information of the image forming apparatus 10 (parent apparatus 10A) with which an association is indicated by the user information.

In step S207, the CPU 11 applies the obtained substitute information to the setting of the child apparatus 10B.

In step S208, the CPU 11 executes the print job. When the CPU 11 obtains the substitute information of the image forming apparatus 10 (parent apparatus 10A) with which an association is indicated by the user information, the CPU 11 uses the obtained substitute information to execute the print job.

As described above, the first exemplary embodiment achieves suppression of output of a result, which a user does not intend to obtain, even when an image forming apparatus, in which substitute information different from that of a preregistered second image forming apparatus is set, executes a print job.

Second Exemplary Embodiment

In the first exemplary embodiment, the case in which, when setting information is not allowed to be applied, the substitute information of an image forming apparatus 10 (parent apparatus 10A) associated with a user is obtained and applied is described. In a second exemplary embodiment, the case in which, when the tray configuration of an image forming apparatus 10, with which an association is indicated by the user information, does not correspond to that of the child apparatus 10B, substitute information is received from the user will be described.

The configuration of an image forming system (see FIG. 1) according to the second exemplary embodiment, the exemplary flow of executing a print job (see FIG. 2), and the hardware configuration of a child apparatus 10B (image forming apparatus 10) (see FIG. 3) are substantially the same as those in the first exemplary embodiment, and will not be described. The functional configuration of a child apparatus 10B (image forming apparatus 10) (see FIG. 4) according to the second exemplary embodiment, exemplary user information (see FIG. 5), exemplary setting information (see FIG. 6), and exemplary tray information (see FIG. 7) are substantially the same as those in the first exemplary embodiment, and will not be described.

Figure 9:
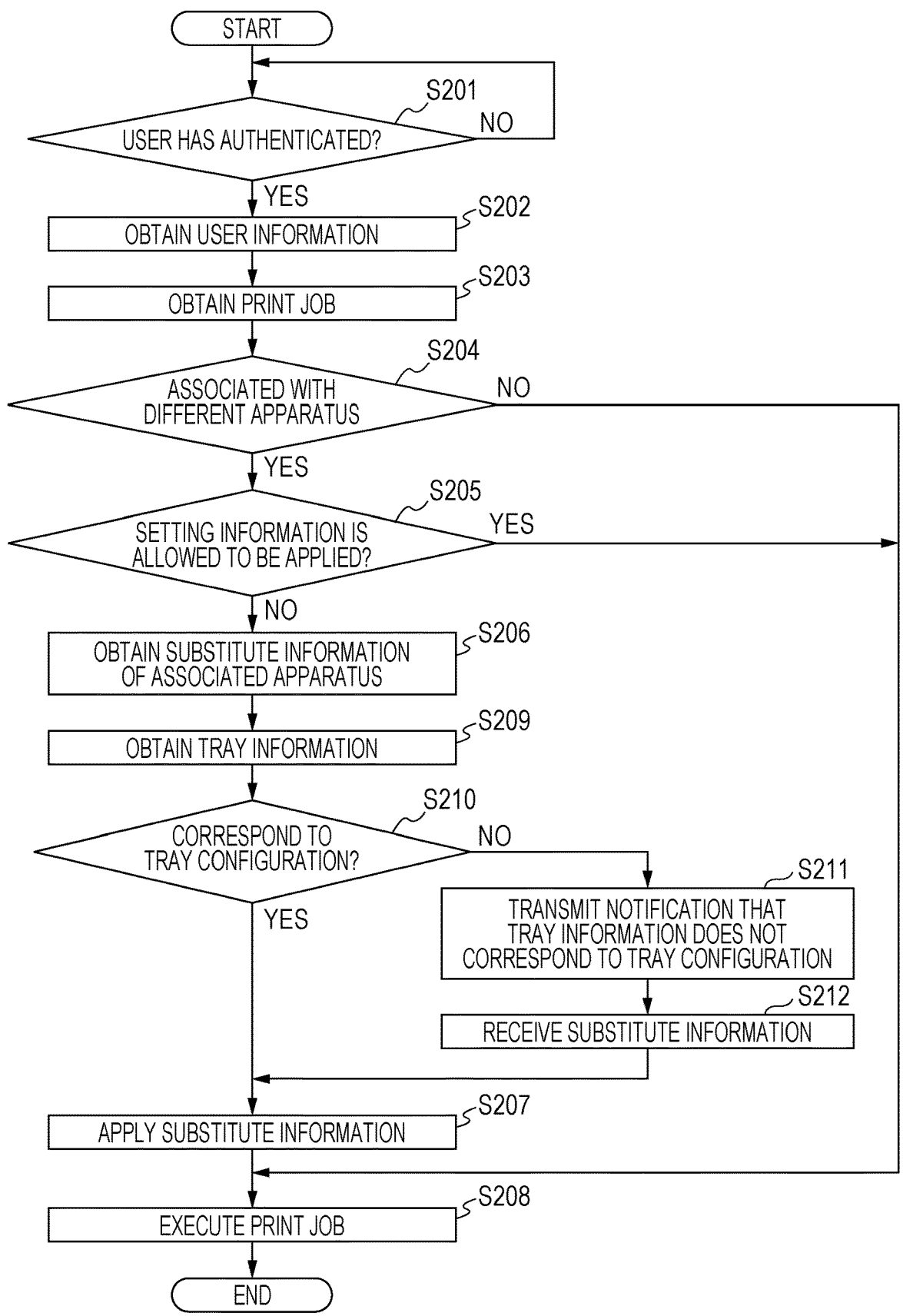
FIG. 9 is a flowchart of an exemplary process of executing a print job, according to a second exemplary embodiment.

By referring to FIG. 9, the operation of a child apparatus 10B (image forming apparatus 10) according to the second exemplary embodiment will be described. FIG. 9 is a flowchart of an exemplary process of executing a print job, according to the second exemplary embodiment. The CPU 11 reads the image forming program from the ROM 12 or the storage 14 for execution. Thus, the image forming process illustrated in FIG. 9 is performed. The image forming process illustrated in FIG. 9 is performed, for example, when a user inputs an instruction to do a print job. In FIG. 9, the same steps as those in the image forming process illustrated in FIG. 8 are designated with the same reference characters as those in FIG. 8, and will not be described.

In step S209, the CPU 11 obtains the tray information of the image forming apparatus 10 (parent apparatus 10A) with which an association is indicated by the user information.

In step S210, the CPU 11 determines whether the obtained tray information corresponds to the tray configuration of the child apparatus 10B. If the obtained tray information corresponds to the tray configuration of the child apparatus 10B (YES in step S210), the CPU 11 proceeds to step S207. If the obtained tray information does not correspond to the tray configuration of the child apparatus 10B (NO in step S210), the CPU 11 proceeds to step S211.

In step S211, the CPU 11 notifies a message that the tray configuration of the image forming apparatus 10, with which an association is indicated by the user information, does not correspond to the tray configuration of the child apparatus 10B.

In step S212, the CPU 11 receives a substitute information alternative from the user.

As described above, similarly to the first exemplary embodiment, the second exemplary embodiment achieves suppression of output of a result, which a user does not intend to obtain, even when an image forming apparatus, in which substitute information different from that of a pre-registered second image forming apparatus is set, executes a print job.

Third Exemplary Embodiment

In the second exemplary embodiment, the case in which, when the tray configuration of an image forming apparatus 10 (parent apparatus 10A), with which an association is indicated by the user information, does not correspond to that of the child apparatus 10B, substitute information is received from a user is described. In a third exemplary embodiment, the case in which, when the substitute information, which is set in the obtained image forming apparatus 10, is not allowed to be applied to the child apparatus 10B, substitute information is received from a user will be described.

The configuration of an image forming system (see FIG. 1) according to the third exemplary embodiment, the exemplary flow of executing a print job (see FIG. 2), and the hardware configuration of a child apparatus 10B (image forming apparatus 10) (see FIG. 3) are substantially the same as those in the first exemplary embodiment, and will not be described. The functional configuration of a child apparatus 10B (image forming apparatus 10) (see FIG. 4) according to the third exemplary embodiment, exemplary user information (see FIG. 5), exemplary setting information (see FIG. 6), and exemplary tray information (see FIG. 7) are substantially the same as those in the first exemplary embodiment, and will not be described.

Figure 10:
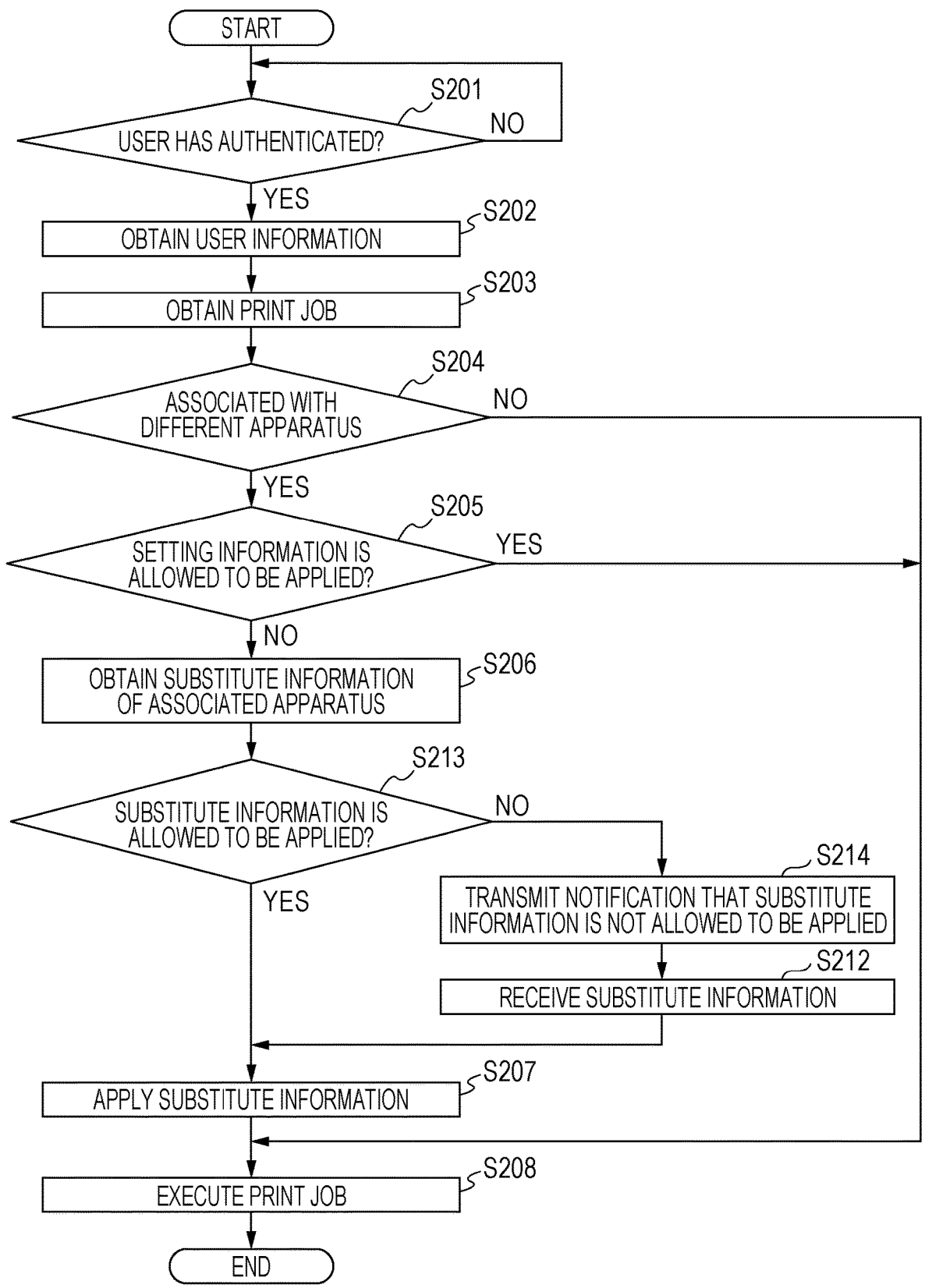
FIG. 10 is a flowchart of an exemplary process of executing a print job, according to a third exemplary embodiment.

By referring to FIG. 10, the operation of a child apparatus 10B (image forming apparatus 10) according to the third exemplary embodiment will be described. FIG. 10 is a flowchart of an exemplary process of executing a print job, according to the third exemplary embodiment. The CPU 11 reads the image forming program from the ROM 12 or the storage 14 for execution. Thus, the image forming process illustrated in FIG. 10 is performed. The image forming process illustrated in FIG. 10 is performed, for example, when a user inputs an instruction to do a print job. In FIG. 10, the same steps as those in the image forming process illustrated in FIG. 9 are designated with the same reference characters as those in FIG. 9, and will not be described.

In step S213, the CPU 11 determines whether the obtained substitute information is allowed to be applied to the child apparatus 10B. If the obtained substitute information is allowed to be applied to the child apparatus 10B (YES in step S213), the CPU 11 proceeds to step S207. If the obtained substitute information is not allowed to be applied (is not possibly applied) to the child apparatus 10B (NO in step S213), the CPU 11 proceeds to step S214.

In step S214, the CPU 11 transmits a notification that the substitute information, which is set in the image forming apparatus 10 with which an association is indicated by the user information, is not allowed to be applied to the child apparatus 10B.

As described above, similarly to the first exemplary embodiment, the third exemplary embodiment achieves suppression of output of a result, which a user does not intend to obtain, even when an image forming apparatus, in which substitute information different from that of a pre-registered second image forming apparatus is set, executes a print job.

In the exemplary embodiments described above, the case in which a user instructs a child apparatus 10B to do a print job is described. However, the case is not limited to this. A user may instruct the parent apparatus 10A to do a print job.

In the exemplary embodiments described above, the case in which a print job transmitted from a user is stored in the parent apparatus 10A is described. However, the case is not limited to this. A print job may be stored in a child apparatus 10B, or may be stored in an image forming apparatus 10 registered for each user.

In the exemplary embodiments described above, the case in which, when a user instructs a child apparatus 10B to do a print job, the child apparatus 10B obtains the print job from the parent apparatus 10A is described. However, the case is not limited to this. When a user instructs the parent apparatus 10A to do a print job, the parent apparatus 10A may obtain the print job from a child apparatus 10B. When a user instructs a child apparatus 10B to do a print job, the child apparatus 10B may obtain the print job from a different child apparatus 10B.

In the exemplary embodiments described above, the case in which the parent apparatus 10A and the child apparatuses 10B are set in advance is described. However, the case is not limited to this. An image forming apparatus 10, which is frequently used by a user (that is, whose frequency of use is the highest), may be set as the parent apparatus 10A.

As described above, the exemplary embodiments are used to describe the present disclosure. However, the present disclosure is not limited to the scope described in the exemplary embodiments. Various changes and improvements may be made to the exemplary embodiments without departing from the gist of the present disclosure. Embodiments obtained by adding the changes and the improvements are also encompassed in the technical scope of the present disclosure.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the case in which the image forming program is installed in a storage is described. However, the case is not limited to this. The image forming program according to the exemplary embodiments may be provided by recording the image forming program in a computer-readable storage medium. For example, the image forming program according to the exemplary embodiments of the present disclosure may be provided by recording the image forming program in an optical disc, such as a compact disc (CD)-ROM or a digital versatile disc (DVD)-ROM. The image forming program according to the exemplary embodiments of the present disclosure may be provided by recording the image forming program in a semiconductor memory, such as a Universal Serial Bus (USB) memory or a memory card. The image forming program according to the exemplary embodiments may be obtained from an external apparatus through a communication line connected to the communication I/F.

What is claimed is:

1. An image forming apparatus comprising:
   a processor configured to:
      obtain user information and a print job, the user information indicating a user associated with a second image forming apparatus different from the image forming apparatus, the print job including setting information about a printing setting;
      if the setting information of the obtained print job is not allowed to be applied to the image forming apparatus, then further obtain substitute information indicating a substitute for the setting information of the second image forming apparatus with which the association is indicated by the user information; and
      execute the print job at the image forming apparatus by applying the obtained substitute information.

2. The image forming apparatus according to claim 1, wherein the processor is configured to:
   further obtain tray information about a tray configuration of the second image forming apparatus; and
   if the tray information corresponds to a tray configuration of the image forming apparatus, then execute the print job by applying the obtained substitute information.

3. The image forming apparatus according to claim 2, wherein the processor is configured to:
   if the tray information does not correspond to the tray configuration of the image forming apparatus, then transmit a notification that the tray information does not correspond to the tray configuration of the image forming apparatus.

4. The image forming apparatus according to claim 1, wherein the processor is configured to:
   determine whether the obtained substitute information is allowed to be applied to the image forming apparatus, and, if the obtained substitute information is allowed to be applied to the image forming apparatus, then execute the print job by applying the substitute information.

5. The image forming apparatus according to claim 2, wherein the processor is configured to:
   determine whether the obtained substitute information is allowed to be applied to the image forming apparatus, and, if the obtained substitute information is allowed to be applied to the image forming apparatus, then execute the print job by applying the substitute information.

6. The image forming apparatus according to claim 3, wherein the processor is configured to:
   determine whether the obtained substitute information is allowed to be applied to the image forming apparatus, and, if the obtained substitute information is allowed to be applied to the image forming apparatus, then execute the print job by applying the substitute information.

7. The image forming apparatus according to claim 4, wherein the processor is configured to:
   if the obtained substitute information is not allowed to be applied to the image forming apparatus, then transmit a notification that the obtained substitute information is not allowed to be applied to the image forming apparatus.

8. The image forming apparatus according to claim 5, wherein the processor is configured to:
   if the obtained substitute information is not allowed to be applied to the image forming apparatus, then transmit a notification that the obtained substitute information is not allowed to be applied to the image forming apparatus.

9. The image forming apparatus according to claim 6, wherein the processor is configured to:
   if the obtained substitute information is not allowed to be applied to the image forming apparatus, then transmit a notification that the obtained substitute information is not allowed to be applied to the image forming apparatus.

10. The image forming apparatus according to claim 1, wherein the processor is configured to:
    obtain a policy for changing the setting information, the policy being obtained as the substitute information.

11. The image forming apparatus according to claim 2, wherein the processor is configured to:
    obtain a policy for changing the setting information, the policy being obtained as the substitute information.

12. The image forming apparatus according to claim 3, wherein the processor is configured to:
    obtain a policy for changing the setting information, the policy being obtained as the substitute information.

13. The image forming apparatus according to claim 4, wherein the processor is configured to:
    obtain a policy for changing the setting information, the policy being obtained as the substitute information.

14. The image forming apparatus according to claim 5, wherein the processor is configured to:
    obtain a policy for changing the setting information, the policy being obtained as the substitute information.

15. The image forming apparatus according to claim 6, wherein the processor is configured to:
    obtain a policy for changing the setting information, the policy being obtained as the substitute information.

16. The image forming apparatus according to claim 7, wherein the processor is configured to:
    obtain a policy for changing the setting information, the policy being obtained as the substitute information.

17. The image forming apparatus according to claim 8, wherein the processor is configured to:
    obtain a policy for changing the setting information, the policy being obtained as the substitute information.

18. The image forming apparatus according to claim 1, wherein the processor is configured to:
    store substitute information of a plurality of image forming apparatuses in advance, the plurality of image forming apparatuses including the second image forming apparatus and being connected to a common network, the image forming apparatus being connected to the common network.

19. A non-transitory computer readable medium storing a program which, if executed, causes a computer to execute a process of an image forming apparatus for image formation, the process comprising:
  obtaining user information and a print job, the user information indicating a user associated with a second image forming apparatus different from the image forming apparatus, the print job including setting information about a printing setting;
  if the setting information of the obtained print job is not allowed to be applied to the image forming apparatus, then further obtaining substitute information indicating a substitute for the setting information of the second image forming apparatus with which the association is indicated by the user information; and
  executing the print job at the image forming apparatus by applying the obtained substitute information.

20. An image forming method for an image forming apparatus, the image forming method comprising:
  obtaining user information and a print job, the user information indicating a user associated with a second image forming apparatus different from the image forming apparatus, the print job including setting information about a printing setting;
  if the setting information of the obtained print job is not allowed to be applied to the image forming apparatus, then further obtaining substitute information indicating a substitute for the setting information of the second image forming apparatus with which the association is indicated by the user information; and
  executing the print job at the image forming apparatus by applying the obtained substitute information.

* * * * *